US012731551B2

(12) United States Patent
Yuan et al.

(10) Patent No.: US 12,731,551 B2
(45) Date of Patent: Sep. 8, 2026

(54) INTEGRATED CIRCUIT UNIT, GATE DRIVE CIRCUIT, AND DISPLAY PANEL

(71) Applicants: Hefei BOE Joint Technology Co., Ltd., Hefei (CN); BOE Technology Group Co., Ltd., Beijing (CN); Beijing BOE Technology Development Co., Ltd., Beijing (CN)

(72) Inventors: Zhidong Yuan, Beijing (CN); Yongqian Li, Beijing (CN)

(73) Assignees: Hefei BOE Joint Technology Co., Ltd., Hefei (CN); BOE Technology Group Co., Ltd., Bejing (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 19/149,532

(22) PCT Filed: Jul. 4, 2024

(86) PCT No.: PCT/CN2024/103651
§ 371 (c)(1),
(2) Date: Jul. 18, 2025

(87) PCT Pub. No.: WO2025/044499
PCT Pub. Date: Mar. 6, 2025

(65) Prior Publication Data

US 2026/0229186 A1 Aug. 6, 2026

(30) Foreign Application Priority Data

Aug. 25, 2023 (CN) ......................... 202311084744.1

(51) Int. Cl.
*G09G 3/3266* (2016.01)

(52) U.S. Cl.
CPC ... *G09G 3/3266* (2013.01); *G09G 2300/0408* (2013.01); *G09G 2310/0286* (2013.01); *G09G 2320/0233* (2013.01)

(58) Field of Classification Search
None
See application file for complete search history.

(56) References Cited

U.S. PATENT DOCUMENTS

2019/0189234 A1* 6/2019 Chen .................... G09G 3/3677
2020/0105357 A1* 4/2020 Xie ...................... G09G 3/3677
(Continued)

FOREIGN PATENT DOCUMENTS

CN 102982768 A 3/2013
CN 109920465 A 6/2019
(Continued)

*Primary Examiner* — Parul H Gupta
(74) *Attorney, Agent, or Firm* — IPro, PLLC

(57) ABSTRACT

An integrated circuit unit, a gate drive circuit and a display panel are provided. The integrated circuit unit includes a first control sub-circuit (20), a second control sub-circuit (30), a third control sub-circuit (40), a fourth control sub-circuit (50) and an output sub-circuit (60). The second control sub-circuit (30) controls the potential at the first node (N1) with assisting through a plurality of gating signals, the first control sub-circuit (20) and the second control sub-circuit (30) control the potential at the first node (N1), and the first node (N1) assists the third control sub-circuit (40) and the fourth control sub-circuit (50) to control the potentials at the second node (N2), the third node (N3) and the fourth node (N4), so as to control the output signal of the output sub-circuit (60).

17 Claims, 9 Drawing Sheets

(56) References Cited

U.S. PATENT DOCUMENTS

| | | | | |
|---|---|---|---|---|
| 2020/0286570 | A1* | 9/2020 | Shan .................... | G09G 3/2092 |
| 2022/0114970 | A1* | 4/2022 | Feng .................... | G09G 3/3266 |

FOREIGN PATENT DOCUMENTS

| | | | |
|---|---|---|---|
| CN | 109935199 | A | 6/2019 |
| CN | 115424583 | A | 12/2022 |
| CN | 117373387 | A | 1/2024 |
| KR | 20170078978 | A | 7/2017 |

* cited by examiner

INTEGRATED CIRCUIT UNIT, GATE DRIVE CIRCUIT, AND DISPLAY PANEL

This is a National Phase Application filed under 35 U.S.C. 371 as a national stage of PCT/CN2024/103651, filed Jul. 4, 2024, an application claiming the benefit of Chinese Application No. 202311084744.1 filed Aug. 25, 2023, the content of each of which is hereby incorporated by reference in its entirety.

TECHNICAL FIELD

The present disclosure relates to the technology of driving a display, in particular to an integrated circuit unit, a gate drive circuit, and a display panel.

BACKGROUND

Active Matrix Organic Light Emitting Diodes (AMOLEDs) are expected to be a mainstream choice for next generation displays due to the characteristics of high contrast, wide viewing angle, and fast response speed. An OLED product is to emit light through an electroluminescent device (i.e., EL device), and a current for emitting light is to be supplied by a driving transistor. In view of differences between driving transistors, a consistency of device characteristics is to be improved for ensuring a uniformity of light emission of the product, and thus an external compensation and a shutdown compensation are desired for correction.

General methods for the external compensation have the problems that a random frame shift signal cannot be output or a too complicated circuit is used.

SUMMARY

The present disclosure aims to provide an integrated circuit unit, a gate drive circuit and a display panel which are simple in structure and capable of achieving random gating.

The present disclosure discloses an integrated circuit unit, including: a first control sub-circuit connected to a second clock signal terminal, a first power signal terminal and a first node, and configured to control a potential at the first node to reach an active potential according to a second clock signal; a second control sub-circuit connected to the first node, the second clock signal terminal, a third clock signal terminal, a fifth power signal terminal, and a plurality of gating signal terminals, and configured to control the potential at the first node to reach an inactive potential according to a third clock signal and signals from the plurality of gating signal terminals; a third control sub-circuit connected to the first node, a second node, a third node, a fourth node, the third clock signal terminal, a fourth clock signal terminal, a second power signal terminal, the fifth power signal terminal, and a sixth power signal terminal, and configured to control a potential at the second node and a potential at the third node to switch between an active potential and an inactive potential; a fourth control sub-circuit connected to the first node, the second node, the third node, the fourth node, the fourth clock signal terminal, the first power signal terminal, and the fifth power signal terminal, and configured to control a potential at the fourth node to switch between an active potential and an inactive potential; and an output sub-circuit connected to the second node, the fourth node, a first clock signal terminal, a fourth power signal terminal, and an output signal terminal, and configured to output a driving signal under a control of the second node and the fourth node.

In some implementations, the integrated circuit unit further includes a reset sub-circuit connected to a reset signal terminal, the first node, the second node, and the fourth control sub-circuit and configured to reset the first node, the second node, and the fourth node.

In some implementations, the third control sub-circuit includes a second node control module, and the second node control module includes: a twenty-second transistor, a first electrode of the twenty-second transistor being connected to the second power signal terminal, a second electrode of the twenty-second transistor being connected to the second node, and a control electrode of the twenty-second transistor being connected to the third clock signal terminal; a twenty-third transistor, a first electrode of the twenty-third transistor being connected to the fifth power signal terminal, a second electrode of the twenty-third transistor being connected to the second node, and a first control electrode of the twenty-third transistor being connected to the fourth node; and a fourteenth transistor and a fifteenth transistor connected in series between the fifth power signal terminal and the second node, a first control electrode of the fourteenth transistor being connected to the first node, and a first control electrode of the fifteenth transistor being connected to the fourth clock signal terminal.

In some implementations, the fourteenth transistor, the fifteenth transistor and the twenty-third transistor each have a plurality of control electrodes, and second control electrodes of the fourteenth transistor, the fifteenth transistor and the twenty-third transistor are all connected to the third node.

In some implementations, the third control sub-circuit includes a third node control module, and the third node control module includes: a twenty-first transistor, a first electrode of the twenty-first transistor being connected to the third node, and a second electrode of the twenty-first transistor being connected to the sixth power signal terminal; a second energy storage unit connected between the third node and the fourth node; and a nineteenth transistor and a twentieth transistor connected in series between the third node and the second power signal terminal, a control electrode of the nineteenth transistor being connected to the first node, and a control electrode of the twentieth transistor being connected to the fourth clock signal terminal.

In some implementations, the third control sub-circuit includes a third node control module, and the third node in the third node control module is directly connected to the sixth power signal terminal.

In some implementations, the second control sub-circuit includes a plurality of gating transistors connected in parallel, the number of the gating transistors is less than or equal to the number of the gating signal terminals, and a control electrode of each of the gating transistors is connected to one gating signal terminal.

In some implementations, first electrodes of the gating transistors connected in parallel are connected to the third clock signal terminal, and second electrodes of the gating transistors connected in parallel are connected to a control electrode of a twelfth transistor for controlling an electrical connection (i.e., a current flowing) between the second clock signal terminal and the first node.

In some implementations, among the gating signal terminals connected to the gating transistors, a pulse width of a gating signal of an $n^{th}$ gating signal terminal is twice a pulse width of a gating signal of an $(n-1)^{th}$ gating signal terminal.

In some implementations, in one period of each of the gating signal terminals, a high level width of the gating signal is equal to a low level width of the gating signal.

In some implementations, the fourth control sub-circuit includes: a twenty-seventh transistor, a first electrode of the twenty-seventh transistor being connected to the fifth power signal terminal, a second electrode of the twenty-seventh transistor being connected to the fourth node, and a first control electrode of the twenty-seventh transistor being connected to the third node; and a twenty-fourth transistor and a twenty-sixth transistor connected in series between the fourth node and the first power signal terminal, a control electrode of the twenty-fourth transistor being connected to the fourth clock signal terminal, and a control electrode of the twenty-sixth transistor being connected to the first node.

In some implementations, the twenty-seventh transistor has a plurality of control electrodes, and the fourth control sub-circuit further includes: a thirty-third transistor, a first electrode of the thirty-third transistor being connected to the reset signal terminal, and a second electrode of the thirty-third transistor being connected to a fifth node; and a fifth energy storage unit connected between the second node and the fifth node, a second control electrode of the twenty-seventh transistor being connected to the fifth node.

In some implementations, the fourth control sub-circuit further includes a twenty-ninth transistor, the twenty-ninth transistor has a plurality of control electrodes, a first electrode of the twenty-ninth transistor is connected to the fifth power signal terminal, a second electrode of the twenty-ninth transistor is connected to the first node, a first control electrode of the twenty-ninth transistor is connected to the third clock signal terminal, and a second control electrode of the twenty-ninth transistor is connected to the fifth node.

The present disclosure further discloses a gate drive circuit, including a plurality of groups of integrated circuit units, each of the groups of integrated circuit units including at least one integrated circuit unit described above, a total number of gating signal terminals being twice a total number of gating transistors, the gating signal terminals including positive gating signal terminals and negative gating signal terminals outputting signals opposite to signals from the positive gating signal terminals.

In some implementations, each of the groups of integrated circuit units includes four integrated circuit units, the integrated circuit units in one group are connected to the gating signal terminals in a same way, and are connected to clock signal terminals in different orders.

In some implementations, the integrated circuit units in different groups are connected to the gating signal terminals in different ways.

The present disclosure further discloses a display panel including the gate drive circuit described above.

Compared with the related art, the integrated circuit unit in the present disclosure is unnecessary to be cascaded, signals output from the integrated circuit unit are not controlled by any other integrated circuit unit, and thus the integrated circuit unit can be applied in a gate drive circuit so as to output a random frame shift signal.

It is to be understood that both the foregoing general description and the following detailed description are exemplary and explanatory only and are not intended to limit the present disclosure.

BRIEF DESCRIPTION OF DRAWINGS

The accompanying drawings, which are incorporated in and constitute a part of the present disclosure, illustrate embodiments consistent with the present disclosure and, together with the present disclosure, serve to explain the principles of the present disclosure.

DETAIL DESCRIPTION OF EMBODIMENTS

Figure 1:
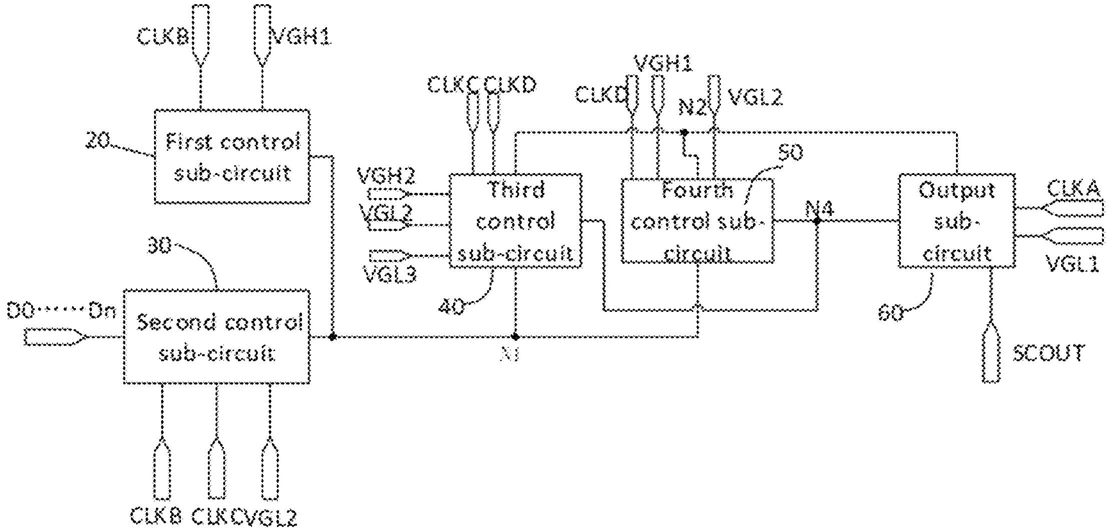
FIG. 1 is a block diagram of an integrated circuit unit according to an embodiment of the present disclosure.

Exemplary embodiments will be described in detail herein, and the examples thereof are illustrated by the drawings. In the following description of the drawings, unless otherwise indicated, the same number in different drawings represents the same or similar element. The implementations described in the following exemplary embodiments do not represent all implementations consistent with the present disclosure. Rather, the implementations described in the following exemplary embodiments are just examples of a device which is consistent with some aspects of the present disclosure as described in detail in the appended claims.

The terms used herein are just for describing the specific embodiments, and are not intended to limit the present disclosure. Unless otherwise defined, the technical terms or scientific terms used herein should have general meanings that are understood by those of ordinary skill in the technical field of the present disclosure. The terms "first", "second" and the like used in the description and the claims of the present disclosure do not denote any order, quantity or importance, but are just used to distinguish between different components. Similarly, the terms "one", "a", and the like do not denote a limitation to quantity, but indicate the existence of "at least one". The term "a plurality of" or "several" indicates two or more. Unless otherwise indicated, "front", "back", "lower" and/or "upper" and the like are for convenience of description, and are not limited to one position or one spatial orientation. The terms "include", "comprise" and the like indicate that an element or object before the terms covers the elements or objects or the equivalents thereof listed after the terms, rather than excluding other elements or objects. The terms "connected", "coupled" and the like are not restricted to a physical or mechanical connection, but may also indicate an electrical connection, whether direct or indirect.

The terms used in the description herein are for the purpose of describing particular embodiments only and are not intended to be limiting of the present disclosure. The terms "a" and "the" used in the description and the claims of the present disclosure which indicate a singular form are also intended to include a plural form, unless the content clearly indicates otherwise. It should be further understood that the term "and/or" used herein refers to any combination or all possible combinations of one or more of associated listed items.

In the related art, general methods for the external compensation have the problems that a random frame shift signal cannot be output or a too complicated circuit is used.

To solve the above technical problems, the present disclosure provides an integrated circuit unit, which includes: a first control sub-circuit 20 connected to a second clock signal terminal CLKB, a first power signal terminal VGH1 and a first node N1, and configured to control (a potential at) the first node N1 to (reach) an active potential according to a second clock signal; a second control sub-circuit 30 connected to the first node N1, the second clock signal terminal CLKB, a third clock signal terminal CLKC, a fifth power signal terminal VGL2, and a plurality of gating signal terminals, and configured to control (a potential at) the first node N1 to (reach) an inactive potential according to a third clock signal and signals from the plurality of gating signal terminals; a third control sub-circuit 40 connected to the first node N1, a second node N2, a third node N3, a fourth node N4, the third clock signal terminal CLKC, a fourth clock signal terminal CLKD, a second power signal terminal VGH2, the fifth power signal terminal VGL2, and a sixth power signal terminal VGL3, and configured to control (a potential at) the second node N2 and (a potential at) the third node N3 to switch between an active potential and an inactive potential; a fourth control sub-circuit 50 connected to the first node N1, the second node N2, the third node N3, the fourth node N4, the fourth clock signal terminal CLKD, the first power signal terminal VGH1, and the fifth power signal terminal VGL2, and configured to control (a potential at) the fourth node N4 to switch between an active potential and an inactive potential; and an output sub-circuit 60 connected to the second node N2, the fourth node N4, a first clock signal terminal CLKA, the fourth power signal terminal VGL1, and an output signal terminal SCOUT, and configured to output a driving signal under a control of the second node N2 and the fourth node N4.

In order to solve the above technical problems, the present disclosure further provides a gate drive circuit, which includes the integrated circuit unit described above.

The present disclosure further provides a display panel which includes the gate drive circuit described above.

The integrated circuit unit in the present disclosure is unnecessary to be cascaded, signals output from the integrated circuit unit are not controlled by any other integrated circuit unit, and thus the integrated circuit unit can be applied in the gate drive circuit so as to output a random frame shift signal.

Hereinafter, various embodiments of the present disclosure conforming to the above inventive concept will be described in detail.

The transistors used in the present disclosure may be triodes, thin film transistors, field effect transistors, or other devices having the same characteristics. The transistors may be P-type transistors or N-type transistors. In the embodiments of the present disclosure, in order to distinguish two electrodes of a transistor other than a control electrode of the transistor, one electrode is referred to as a first electrode, and the other is referred to as a second electrode.

In practical applications, in response to the transistor being a triode, the control electrode may be a base, the first electrode may be a collector, and the second electrode may be an emitter; or, the control electrode may be a base, the first electrode may be an emitter, and the second electrode may be a collector.

In practical applications, in response to the transistor being a thin film transistor or a field effect transistor, the control electrode may be a gate, the first electrode may be a drain, and the second electrode may be a source; or, the control electrode may be a gate, the first electrode may be a source, and the second electrode may be a drain.

The present disclosure provides an integrated circuit unit.

Figure 2:
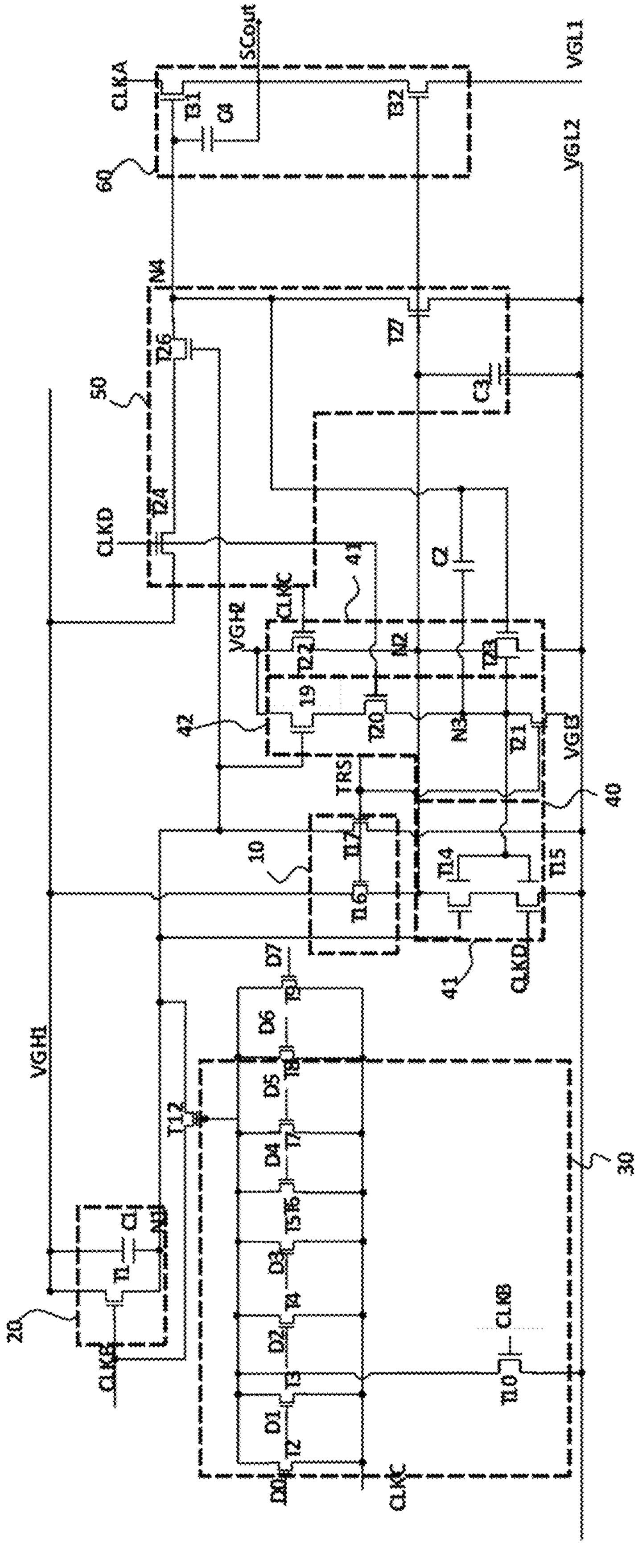
FIG. 2 is a circuit diagram of an integrated circuit unit according to an embodiment of the present disclosure.

As shown in FIGS. 1 and 2, a reset sub-circuit 20 is connected to a reset signal terminal TRS, the first node N1, the second node N2, and the fourth control sub-circuit 50, and is configured to reset the first node N1, the second node N2, and the fourth node N4. The reset sub-circuit 20 includes a sixteenth transistor T16 and a seventeenth transistor T17. A first electrode of the sixteenth transistor T16 is connected to the second node N2, a second electrode of the sixteenth transistor T16 is connected to the first power signal terminal VGH1, and a control electrode of the sixteenth transistor T16 is connected to the reset signal terminal TRS, so as to reset the second node N2 according to a reset signal. A first electrode of the seventeenth transistor T17 is connected to the first node N1, a second electrode of the seventeenth transistor T17 is connected to the fifth power signal terminal VGL2, and a control electrode of the seventeenth transistor T17 is connected to the reset signal terminal TRS, so as to reset the first node N1 according to the reset signal. The reset signal terminal TRS is further connected to the third control sub-circuit 40 and the fourth control sub-circuit 50, so as to reset the third node N3 and the fourth node N4 according to the reset signal.

The first control sub-circuit 20 is connected to the second clock signal terminal CLKB, the first power signal terminal VGH1 and the first node N1. The first control sub-circuit 20 includes a first transistor T1 and a first energy storage unit C1. A first electrode of the first transistor T1 is connected to the first node N1, a second electrode of the first transistor T1 is connected to the first power signal terminal VGH1, and a control electrode of the first transistor T1 is connected to the second clock signal terminal CLKB, so that a first power signal is controlled to be output to the first node N1 under a control of the second clock signal, thereby pulling up an electrical level at the first node N1.

The second control sub-circuit 30 is connected to the first node N1, the second clock signal terminal CLKB, the third clock signal terminal CLKC, the fifth power signal terminal VGL2, and a plurality of gating signal terminals. The second control sub-circuit 30 includes a tenth transistor T10, a twelfth transistor T12, and a plurality of gating transistors connected in parallel. A terminal of each of the plurality of gating transistors connected in parallel is connected to the third clock signal terminal CLKC, and another terminal of each of the plurality of gating transistors connected in parallel is connected to a first electrode of the tenth transistor T10 and a control electrode of the twelfth transistor T12. A second electrode of the tenth transistor T10 is connected to the fifth power signal terminal VGL2, and a control electrode of the tenth transistor T10 is connected to the second clock signal terminal CLKB. A first electrode of the twelfth transistor T12 is connected to the second clock signal terminal CLKB, and a second electrode of the twelfth transistor T12 is connected to the first node N1.

The number of the gating transistors connected in parallel may be changed as desired, and may be 1, 3, 6, 8, or 11, or the like. The number of the gating signal terminals is greater than or equal to the number of the gating transistors, and the control electrode of each of the gating transistors is connected to one gating signal terminal. Among the gating signal terminals connected to the plurality of gating transistors, a pulse width from a gating signal of an $n^{th}$ gating signal terminal is twice a pulse width of a gating signal from an $(n-1)^{th}$ gating signal terminal, n>1. In one period of each of the gating signal terminals, a width of a high level of the gating signal is equal to a width of a low level of the gating signal. In the embodiment, a case where eight gating transistors and eight gating signal terminals are provided is taken as an example. The eight gating transistors include a second transistor T2 to a ninth transistor T9, and the eight gating signal terminals include a first gating signal terminal D0 to an eighth gating signal terminal D7. The eight gating transistors are correspondingly connected to the eight gating signal terminals. One period of the eighth gating signal terminal D7 may cover $2^8$ periods of the first gating signal terminal D0. One high-level section of the eighth gating signal terminal D7 may cover $2^7$ periods of the first gating signal terminal D0.

In a case where the third clock signal terminal CLKC is at a high level and the gating signal from any one of the eight gating signal terminals connected to the gating transistors has a high level, the second control sub-circuit 30 controls the twelfth transistor T12 to be turned on, so that the second clock signal terminal CLKB is electrically connected to the first node N1 (i.e., a current flows between the second clock signal terminal CLKB and the first node N1), thereby pulling down the electrical level at the first node N1.

In some implementations, the number of the gating signal terminals may be greater than eight, and a gating signal terminal opposite to any one of the first gating signal terminal D0 to the eighth gating signal terminal D7 in phase may be added. For example, a ninth gating signal terminal D0' opposite to the first gating signal terminal D0 in phase may be added. Or, eight signal terminals, i.e., a ninth gating signal terminal D0' to a sixteenth gating signal terminal D7' that are respectively opposite to the first gating signal terminal D0 to the eighth gating signal terminal D7 in phase are added. One of each pair of gating signal terminals having opposite phases is selected to be communicated with the control electrode of the gating transistor. Taking eight pairs of gating signal terminals having opposite phases as an example, $2^8$ combinations may be obtained, and effective outputs in $2^8$ different timing sequences may be realized.

The third control sub-circuit 40 is connected to the first node N1, the second node N2, the third node N3, the fourth node N4, the third clock signal terminal CLKC, the fourth clock signal terminal CLKD, the second power signal terminal VGH2, the fifth power signal terminal VGL2, and the sixth power signal terminal VGL3. The third control sub-circuit 40 includes a second node control module 41 and a third node control module 42.

The second node control module 41 includes a twenty-second transistor T22 configured to pull up a potential at the second node N2, and a fourteenth transistor T14, a fifteenth transistor T15 and a twenty-third transistor T23 configured to pull down the potential at the second node N2. A first electrode of the twenty-second transistor T22 is connected to the second power signal terminal VGH2, a second electrode of the twenty-second transistor T22 is connected to the second node N2, and a control electrode of the twenty-second transistor T22 is connected to the third clock signal terminal CLKC. A first electrode of the twenty-third transistor T23 is connected to the fifth power signal terminal VGL2, a second electrode of the twenty-third transistor T23 is connected to the second node N2, and a first control electrode of the twenty-third transistor T23 is connected to the fourth node N4. A first electrode of the fourteenth transistor T14 is connected to the second node N2, a second electrode of the fourteenth transistor T14 is connected to a first electrode of the fifteenth transistor T15, and a control electrode of the fourteenth transistor T14 is connected to the first node N1. A second electrode of the fifteenth transistor T15 is connected to the fifth power signal terminal VGL2, and a control electrode of the fifteenth transistor T15 is connected to the fourth clock signal terminal CLKD.

In an alternative embodiment, the third node control module 42 includes a nineteenth transistor T19 and a twentieth transistor T20 configured to pull up a potential at the third node N3, a twenty-first transistor T21 configured to pull down the potential at the third node N3, and a second energy storage unit C2 connected to the third node N3 and the fourth node N4. A first electrode of the nineteenth transistor T19 is connected to the second power signal terminal VGH2, a second electrode of the nineteenth transistor T19 is connected to a first electrode of the twentieth transistor T20, and a control electrode of the nineteenth transistor T19 is connected to the first node N1. A second electrode of the twentieth transistor T20 is connected to the third node N3 and a control electrode of the twentieth transistor T20 is connected to the fourth clock signal terminal CLKD. A first electrode of the twenty-first transistor T21 is connected to the sixth power signal terminal VGL3, a second electrode of the twenty-first transistor T21 is connected to the third node N3, and a control electrode of the twenty-first transistor T21 is connected to the reset signal terminal TRS.

The fourteenth transistor T14, the fifteenth transistor T15 and the twenty-third transistor T23 each have a plurality of control electrodes, and second control electrodes of the fourteenth transistor T14, the fifteenth transistor T15 and the twenty-third transistor T23 are all connected to the third node N3.

The fourth control sub-circuit 50 is connected to the first node N1, the second node N2, the third node N3, the fourth node N4, the fourth clock signal terminal CLKD, the first power signal terminal VGH1, and the fifth power signal terminal VGL2. The fourth control sub-circuit 50 includes a twenty-fourth transistor T24 and a twenty-sixth transistor T26 configured to pull up a potential at the fourth node N4, and a twenty-seventh transistor T27 configured to pull down the potential at the fourth node N4. A first electrode of the twenty-fourth transistor T24 is connected to the first power signal terminal VGH1, a second electrode of the twenty-fourth transistor T24 is connected to a first electrode of the twenty-sixth transistor T26, and a control electrode of the twenty-fourth transistor T24 is connected to the fourth clock signal terminal CLKD. A second electrode of the twenty-sixth transistor T26 is connected to the fourth node N4, and a control electrode of the twenty-sixth transistor T26 is connected to the first node N1. A first electrode of the twenty-seventh transistor T27 is connected to the fifth power signal terminal VGL2, a second electrode of the twenty-seventh transistor T27 is connected to the fourth node N4, and a control electrode of the twenty-seventh transistor T27 is connected to the second node N2. In some implementations, a third energy storage unit C3 is disposed between the control electrode of the twenty-seventh transistor T27 and the fifth power signal terminal VGL2.

The output sub-circuit 60 is connected to the second node N2, the fourth node N4, the first clock signal terminal CLKA, the fourth power signal terminal VGL1 and the output signal terminal SCOUT. The output sub-circuit 60 includes a thirty-first transistor T31 configured to control the output signal terminal SCOUT to output a signal from the first clock signal terminal CLKA, and a thirty-second transistor T32 configured to control the output signal terminal SCOUT to output a signal from the fourth power signal terminal VGL1. A first electrode of the thirty-first transistor T31 is connected to the first clock signal terminal CLKA, a second electrode of the thirty-first transistor T31 is connected to the output signal terminal SCOUT, and a control electrode of the thirty-first transistor T31 is connected to the fourth node N4. A first electrode of the thirty-second transistor T32 is connected to the fourth power signal terminal VGL1, a second electrode of the thirty-second transistor T32 is connected to the output signal terminal SCOUT, and a control electrode of the thirty-second transistor T32 is connected to the second node N2. In some implementations, a fourth energy storage unit C4 is disposed between the output signal terminal SCOUT and the control electrode of the thirty-first transistor T31.

Figure 3:
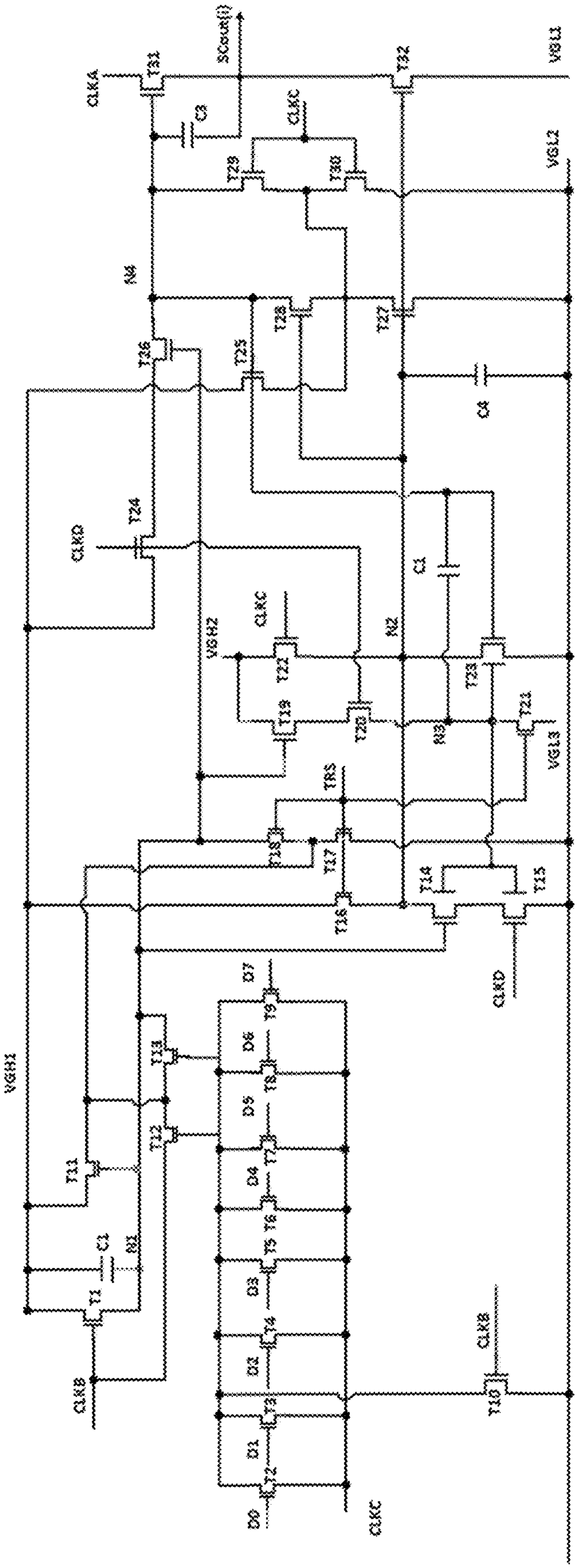
FIG. 3 is a circuit diagram of an integrated circuit unit according to an embodiment of the present disclosure.

As shown in FIG. 3, in an alternative embodiment, a twenty-ninth transistor T29 and a thirtieth transistor T30 are further connected in series between the fourth node N4 and the fifth power signal terminal VGL2. Control electrodes of the twenty-ninth transistor T29 and the thirtieth transistor T30 are both connected to the third clock signal terminal CLKC. The twenty-ninth transistor T29 and the thirtieth transistor T30 facilitate to pull down a voltage at the fourth node N4 more effectively, so that the thirty-first transistor T31 can be turned off more completely. In some implementations, a twenty-eighth transistor T28 is connected in series in a path in which the fourth node, the twenty-seventh transistor T27, and the fifth power signal terminal VGL2 are sequentially connected. An eighteenth transistor T18 is connected in series in a path in which the first node N1, the seventeenth transistor T17, and the fifth power signal terminal VGL2 are sequentially connected. A thirteenth transistor T13 is connected in series in a path in which the first node N1, the twelfth transistor T12 and the second clock signal terminal CLKB are sequentially connected, thereby preventing a leakage current from occurring. In some implementations, an eleventh transistor T11 may be provided, a first electrode of the eleventh transistor T11 is connected to the first power signal terminal VGH1, a control electrode of the eleventh transistor T11 is connected to the first node N1, and a second electrode of the eleventh transistor T11 is connected between the twelfth transistor T12 and the thirteenth transistor T13 and between the seventeenth transistor T17 and the eighteenth transistor T18, respectively. In some implementations, a twenty-fifth transistor T25 may be provided, a first electrode of the twenty-fifth transistor T25 is connected to the first power signal terminal VGH1, a control electrode of the twenty-fifth transistor T25 is connected to the fourth node N4, and a second electrode of the twenty-fifth transistor T25 is connected between the twenty-ninth transistor T29 and the thirtieth transistor T30. The anti-leakage measures mentioned above may be selectively added according to the actual applications, and different anti-leakage measures can be selectively combined together.

Figure 4:
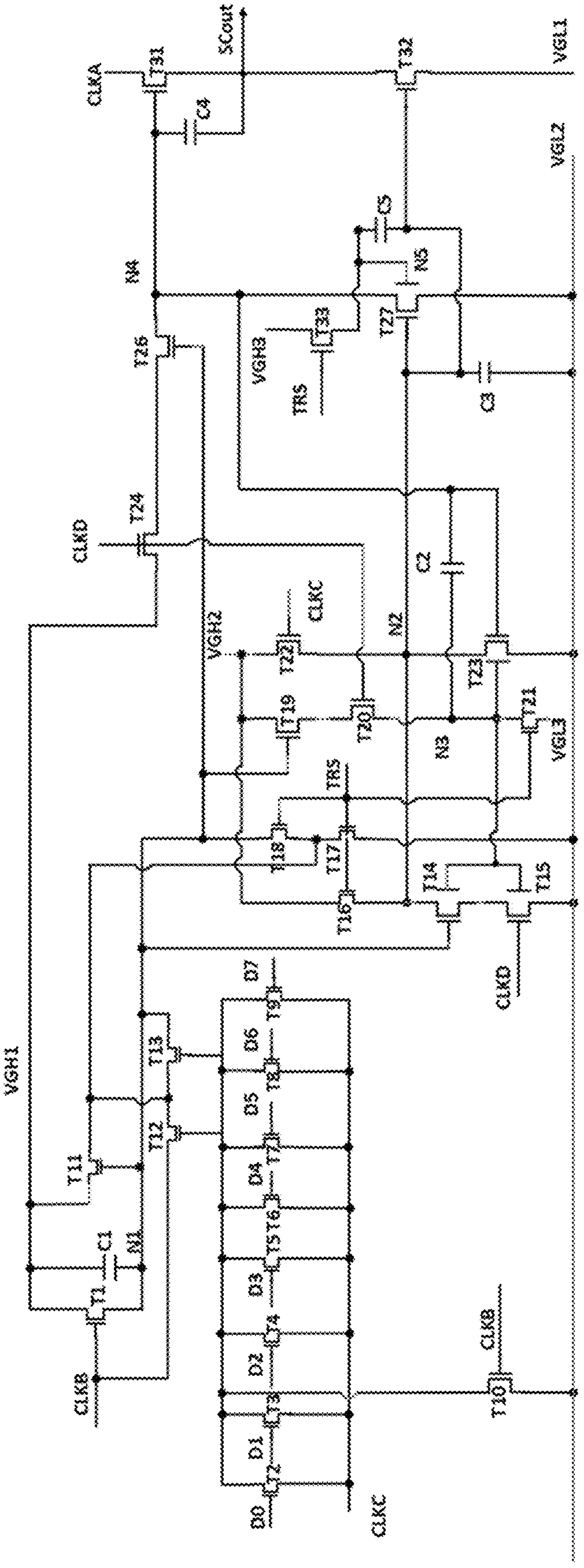
FIG. 4 is a circuit diagram of an integrated circuit unit according to an embodiment of the present disclosure.

In an alternative embodiment, as shown in FIG. 4, the fourth control sub-circuit 50 further includes a thirty-third transistor T33. A first electrode of the thirty-third transistor T33 is connected to the reset signal terminal TRS, and a second electrode of the thirty-third transistor T33 is connected to the fifth node N5. A fifth energy storage unit C5 is connected between the second node N2 and the fifth node N5. The twenty-seventh transistor T27 has a plurality of control electrodes, and a first control electrode of the twenty-seventh transistor T27 is connected to the second node N2, and a second control electrode of the twenty-seventh transistor T27 is connected to the fifth node N5.

Figure 5:
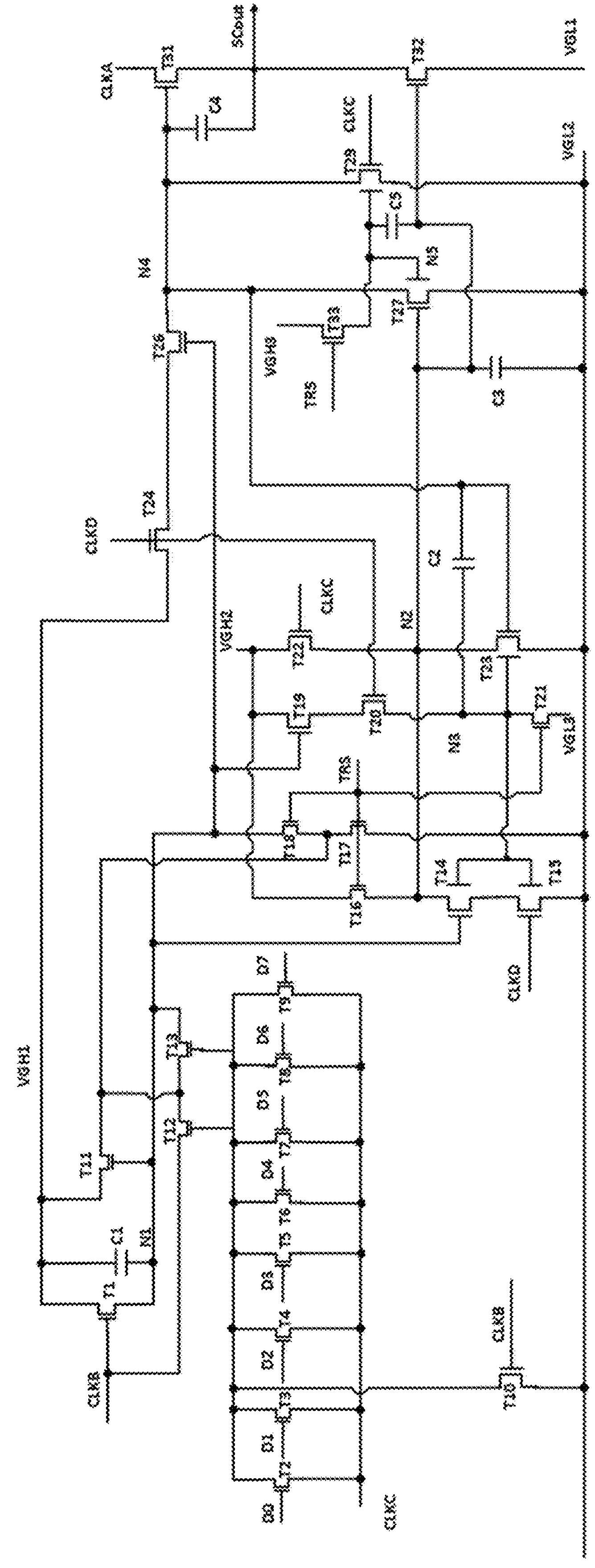
FIG. 5 is a circuit diagram of an integrated circuit unit according to an embodiment of the present disclosure.

In an alternative embodiment, as shown in FIG. 5, the fourth control sub-circuit 50 further includes a twenty-ninth transistor T29, and the twenty-ninth transistor T29 has a plurality of control electrodes. A first electrode of the twenty-ninth transistor T29 is connected to the fifth power signal terminal VGL2, a second electrode of the twenty-ninth transistor T29 is connected to the fourth node N4, a first control electrode of the twenty-ninth transistor T29 is connected to the third clock signal terminal CLKC, and a second control electrode of the twenty-ninth transistor T29 is connected to the fifth node N5.

Figure 6:
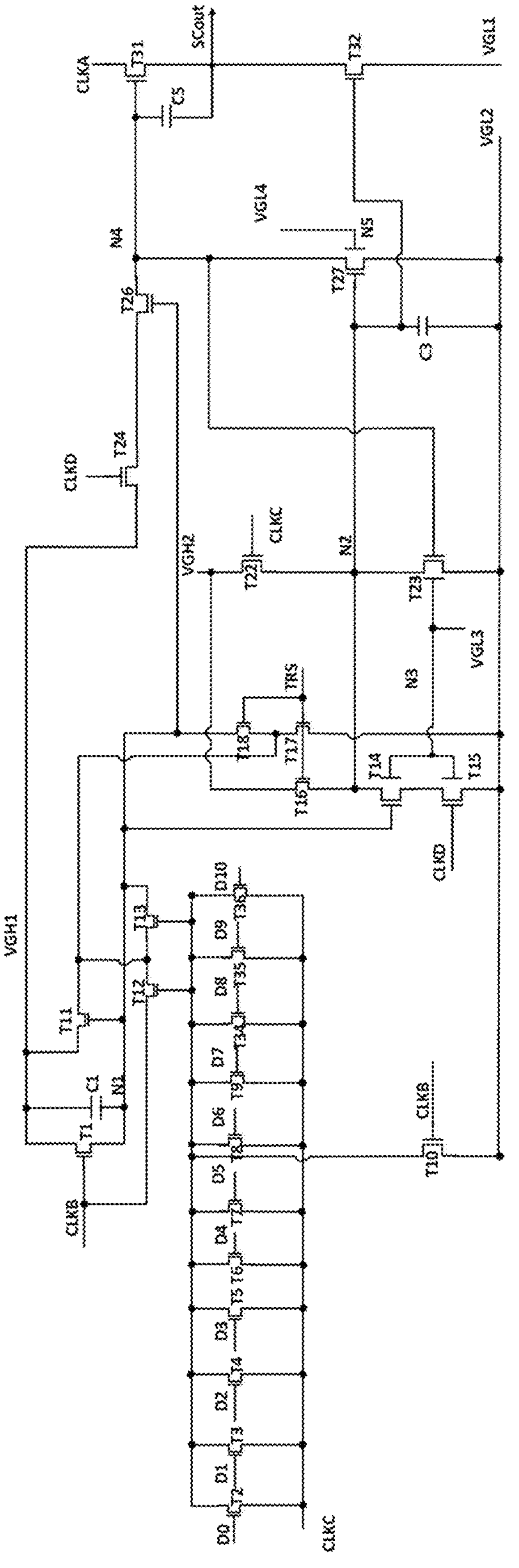
FIG. 6 is a circuit diagram of an integrated circuit unit according to an embodiment of the present disclosure.

As shown in FIG. 6, in an alternative embodiment, the third node N3 is directly connected to the sixth power signal terminal VGL3. The third node N3 is connected to the second control electrodes of the fourteenth transistor T14, the fifteenth transistor T15 and the twenty-third transistor T23.

As shown in FIG. 6, in an alternative embodiment, the twenty-seventh transistor T27 has a plurality of control electrodes, a first control electrode of the twenty-seventh transistor T27 is connected to the second node N2, and the second control electrode of the twenty-seventh transistor T27 is connected to a seventh power signal terminal VGL4. In some implementations, the second control electrode of the twenty-seventh transistor T27 may be connected to the sixth power signal terminal VGL3 and not to the seventh power signal terminal VGL4.

Figure 7:
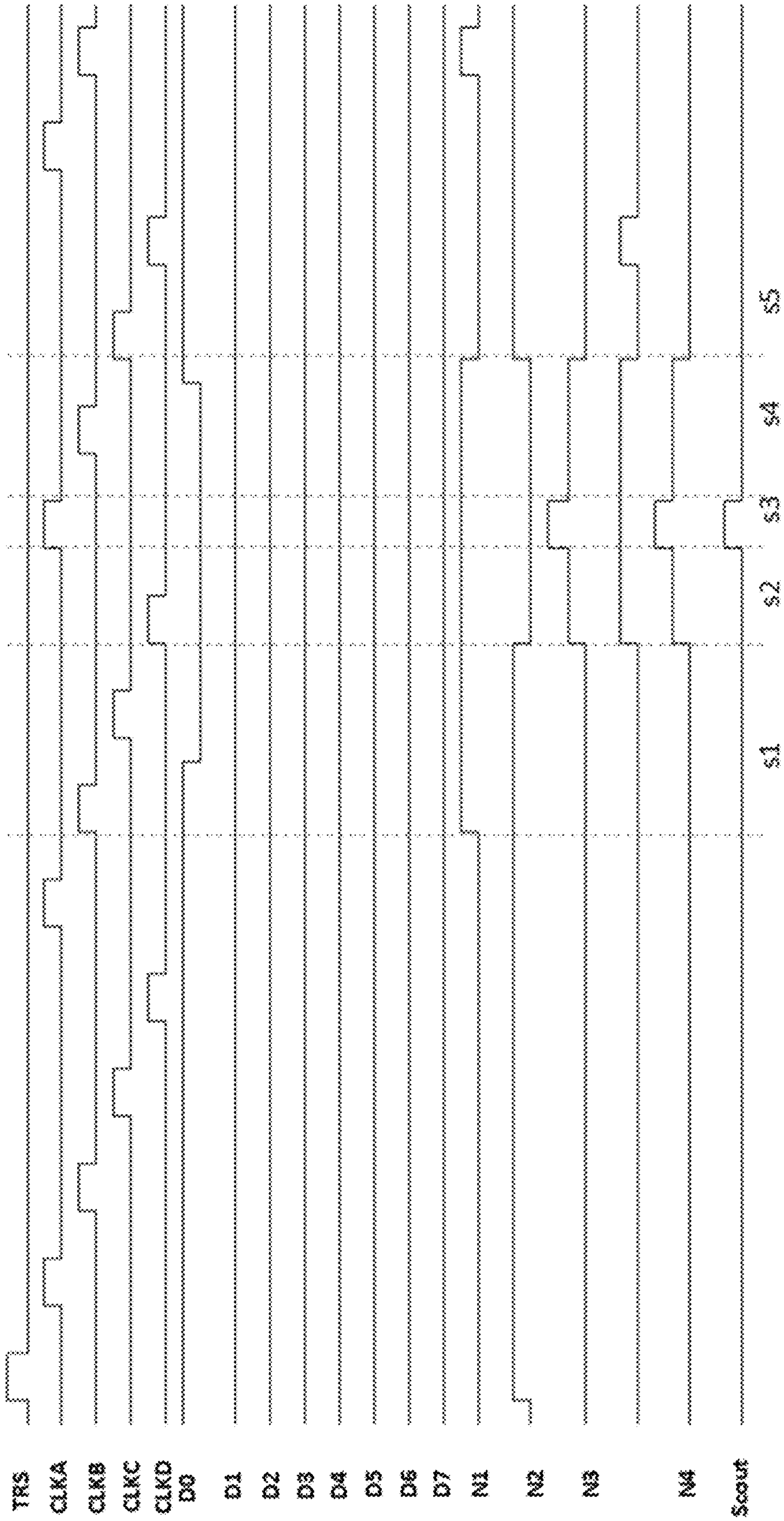
FIG. 7 is a timing diagram of an integrated circuit unit according to an embodiment of the present disclosure.

Referring to FIG. 7, FIG. 7 is a timing diagram of an alternative embodiment. The reset signal terminal TRS is reset first, to pull up the potential at the second node N2, and pull down the potential at the third node N3 to a potential at the sixth power signal terminal VGL3. The potential at the sixth power signal terminal VGL3 is lower than that at the fifth power signal terminal VGL2, so that the potential at the second node N2 can be effectively maintained in response to the reset signal terminal TRS outputting a low potential.

In a first stage S1, the second clock signal terminal CLKB outputs a high potential, and the potential at the first node N1 is pulled up. In response to the third clock signal terminal CLKC outputting the high potential, since the gating signal terminal D0 to the gating signal terminal D7 are all at a low potential, the twelfth transistor T12 is turned off, and the potential at the first node N1 maintains the high potential.

In a second stage S2, the fourth clock signal terminal CLKD outputs the high potential, and the potential at the first node N1 maintains the high potential. The potential at the second node N2 is pulled down, the potential at the third node N3 is pulled up to a potential at the second power signal terminal VGH2, and the potential at the fourth node N4 is pulled up to a potential at the first power signal terminal VGH1. The potential at the second power signal terminal VGH2 is lower than that at the first power signal terminal VGH1, so that the potential at the third node N3 is lower than that at the fourth node N4. The thirty-first transistor T31 is turned on.

In a third stage S3, the fourth node N4 is maintained at a high potential, the first clock terminal CLKA outputs a high potential, and the output signal terminal SCOUT outputs a high potential. The fourth node N4 is coupled to a higher potential due to the fourth energy storage unit C4, and the third node N3 is also coupled to a higher potential due to the second energy storage unit C2.

In a fourth stage S4, the third clock signal terminal CLKC outputs a high potential, the potential at the fourth node N4 is pulled down, and the potential at the second node N2 is pulled up. In this case, the first gating signal terminal D0 outputs a high potential, and the potential at the first node N1 is pulled down. Since the potential at the third node N3 is lower than the potential at the fourth node N4, the third node N3 is coupled to a lower potential, and the fourteenth transistor T14, the fifteenth transistor T15 and the twenty-third transistor T23 can be turned off better.

In a fifth stage S5, the first node N1 is maintained at a low potential, the fourth clock signal terminal CLKD outputs a high potential, the fourth node N4 is maintained at a low potential, and the second node N2 is maintained at a high potential. The output signal terminal SCOUT outputs a low potential.

In the integrated circuit unit of the present disclosure, the potential at the first node N1 is controlled by the first control sub-circuit 20 and the second control sub-circuit 30, and the potentials at the second node, the third node and the fourth node are controlled by the first node N1 in cooperation with the clock signal, thereby controlling the output signal of the output signal terminal SCOUT. The integrated circuit unit of the present disclosure is unnecessary to be cascaded with any other integrated circuit unit, and in response to the integrated circuit unit of the present disclosure being applied in a gate drive circuit, a certain pixel row can be randomly compensated. The stability of the output sub-circuit 60 is improved by the stable regulation of the second node N2, and the influence on the thirty-second transistor T32 is reduced.

Figure 8:
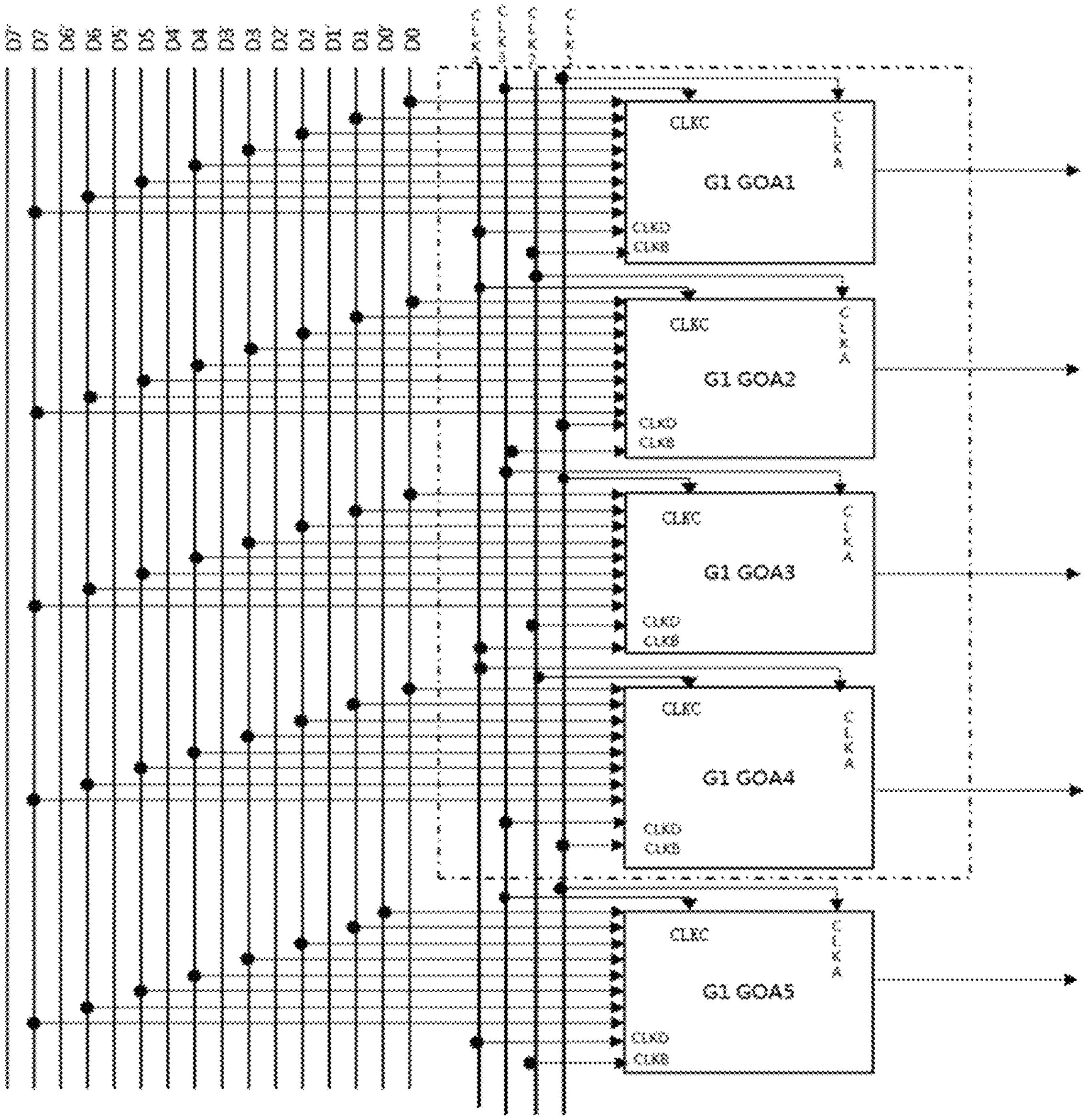
FIG. 8 is a schematic diagram illustrating connections of a gate drive circuit according to an embodiment of the present disclosure.
Figure 9:
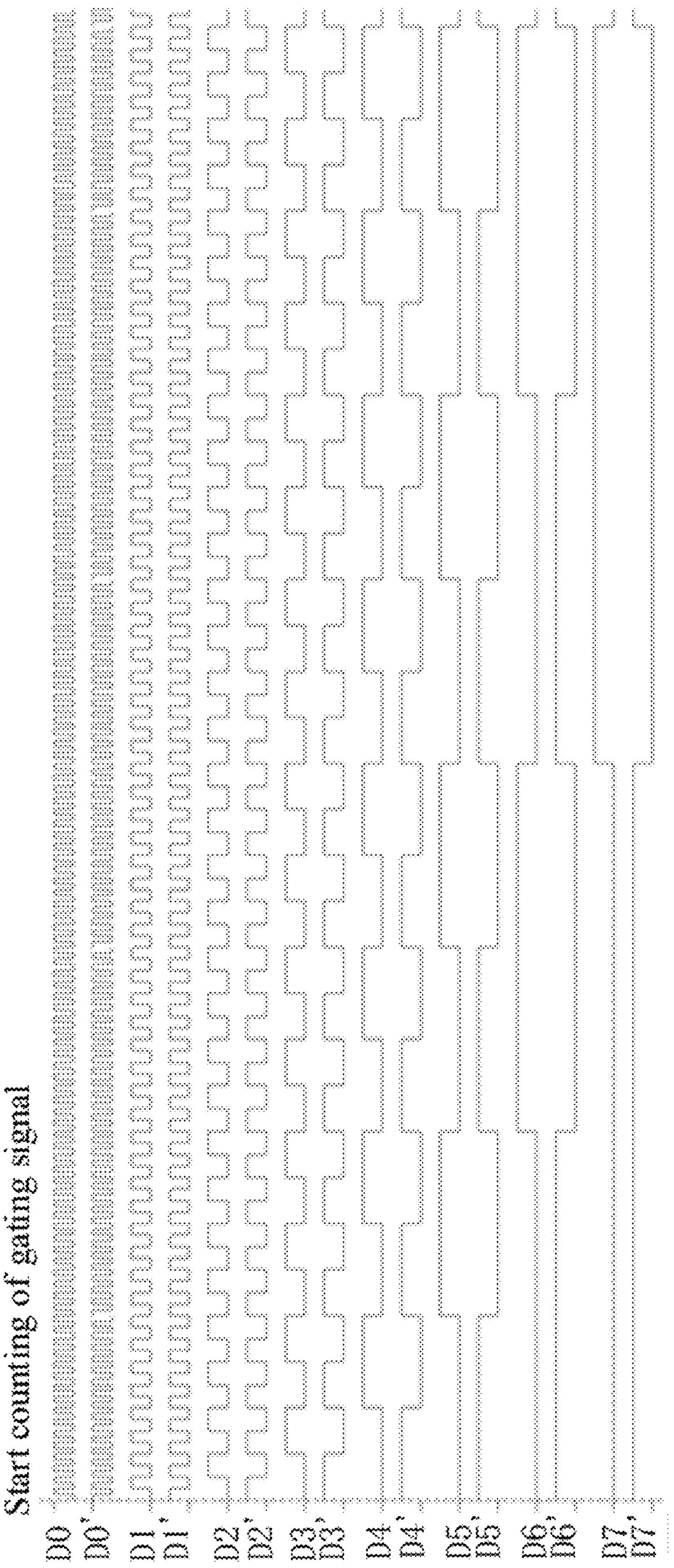
FIG. 9 is a timing diagram of gating signal terminals of an integrated circuit unit according to an embodiment of the present disclosure.

As shown in FIG. 8 and FIG. 9, the present disclosure further discloses a gate drive circuit, including a plurality of groups of integrated circuit units. Each of the groups of integrated circuit units includes at least one integrated circuit unit described above. Each integrated circuit unit includes n gating transistors. The gate drive circuit includes 2n gating signal terminals, which include sixteen signal terminals including D0, D0', D1, D1', D2, D2', D3, D3', D4, D4', D5, D5, . . . , Dn, and Dn', and signals from D0', D1', D2', D3', D4', D5', . . . , Dn' are reversed from signals of D0, D1, D2, D3, D4, D5, . . . , Dn respectively. A pulse width of a signal from Da is twice that of a signal from D(a−1). The integrated circuit units in different groups are connected to the gating signal terminals in different ways. The number of the gating transistors may be set as desired.

In an embodiment, a control electrode of an $a^{th}$ gating transistor in the n gating transistors is selectively connected to one of Da or Da', with a being greater than 0 and less than n. The integrated circuit units in one group are connected to the gating signal terminals in a same way. In this way, (2n+1) groups of integrated circuit units may operate independently. In some implementations, one group of integrated circuit units includes four integrated circuit units, and the four integrated circuit units achieve shift output by being connected to clock signal terminals in different orders. Thus, the gate drive circuit in the embodiment can realize independent operations of (2n+3) rows. In a row shift stage, the gate drive circuit may control signal output of the gating signal terminals and the clock signal terminals to perform a sequential row shift. In the Blanking Time, the gate drive circuit may control signal output of the gating signal terminals and the clock signal terminals to perform a random frame shift, thereby realizing a random external compensation.

The present disclosure further discloses a display panel, including the gate drive circuit described above.

Other embodiments of the present disclosure will be apparent to one of ordinary skill in the art from considering and practicing the present disclosure. The present disclosure is intended to cover any variations, uses, or adaptations of the present disclosure following the general principle of the present disclosure and including the common general knowledge or the common technical means in the art which is not recited in the present disclosure. The present disclosure and the embodiments are considered as exemplary only, and a true scope and concept of the present disclosure is set forth in the appended claims.

It will be understood that the present disclosure is not limited to the precise arrangements that have been described above and shown in the drawings, and that various modifications and changes may be made without departing from the scope of the present disclosure. The scope of the present disclosure is limited only by the appended claims.

The above description is only for some embodiments of the present disclosure, and should not be taken as limiting the present disclosure, and any modifications, equivalent substitutions, improvements and the like made within the concept and principle of the present disclosure should be included in the protection scope of the present disclosure.

What is claimed is:

1. An integrated circuit unit, comprising:

a first control sub-circuit connected to a second clock signal terminal, a first power signal terminal and a first node, and configured to control a potential at the first node to reach an active potential according to a second clock signal;

a second control sub-circuit connected to the first node, the second clock signal terminal, a third clock signal terminal, a fifth power signal terminal, and a plurality of gating signal terminals, and configured to control the potential at the first node to reach an inactive potential according to a third clock signal and signals from the plurality of gating signal terminals;

a third control sub-circuit connected to the first node, a second node, a third node, a fourth node, the third clock signal terminal, a fourth clock signal terminal, a second power signal terminal, the fifth power signal terminal, and a sixth power signal terminal, and configured to control a potential at the second node and a potential at the third node to switch between an active potential and an inactive potential;

a fourth control sub-circuit connected to the first node, the second node, the third node, the fourth node, the fourth clock signal terminal, the first power signal terminal, and the fifth power signal terminal, and configured to control a potential at the fourth node to switch between an active potential and an inactive potential; and an output sub-circuit connected to the second node, the fourth node, a first clock signal terminal, the fourth power signal terminal, and an output signal terminal, and configured to output a driving signal under a control of the second node and the fourth node.

2. The integrated circuit unit of claim 1, further comprising a reset sub-circuit connected to a reset signal terminal, the first node, the second node, and the fourth control sub-circuit and configured to reset the first node, the second node, and the fourth node.

3. The integrated circuit unit of claim 2, wherein the fourth control sub-circuit comprises:

a twenty-seventh transistor, wherein a first electrode of the twenty-seventh transistor is connected to the fifth power signal terminal, a second electrode of the twenty-seventh transistor is connected to the fourth node, and a first control electrode of the twenty-seventh transistor is connected to the third node; and a twenty-fourth transistor and a twenty-sixth transistor connected in series between the fourth node and the first power signal terminal, wherein a control electrode of the twenty-fourth transistor is connected to the fourth clock signal terminal, and a control electrode of the twenty-sixth transistor is connected to the first node.

4. The integrated circuit unit of claim 3, wherein the twenty-seventh transistor has a plurality of control electrodes, and the fourth control sub-circuit further comprises:

a thirty-third transistor, wherein a first electrode of the thirty-third transistor is connected to the reset signal terminal, and a second electrode of the thirty-third transistor is connected to the fifth node; and a fifth energy storage unit connected between the second node and the fifth node; and a second control electrode of the twenty-seventh transistor is connected to the fifth node.

5. The integrated circuit unit of claim 4, wherein the fourth control sub-circuit further comprises:

a twenty-ninth transistor, wherein the twenty-ninth transistor has a plurality of control electrodes, a first electrode of the twenty-ninth transistor is connected to the fifth power signal terminal, a second electrode of the twenty-ninth transistor is connected to the first node, a first control electrode of the twenty-ninth transistor is connected to the third clock signal terminal, and a second control electrode of the twenty-ninth transistor is connected to the fifth node.

6. The integrated circuit unit of claim 1, wherein the third control sub-circuit comprises a second node control module, and the second node control module comprises:

a twenty-second transistor, wherein a first electrode of the twenty-second transistor is connected to the second power signal terminal, a second electrode of the twenty-second transistor is connected to the second node, and a control electrode of the twenty-second transistor is connected to the third clock signal terminal;

a twenty-third transistor, wherein a first electrode of the twenty-third transistor is connected to the fifth power signal terminal, a second electrode of the twenty-third transistor is connected to the second node, and a first control electrode of the twenty-third transistor is connected to the fourth node; and a fourteenth transistor and a fifteenth transistor connected in series between the fifth power signal terminal and the second node, wherein a first control electrode of the fourteenth transistor is connected to the first node, and a first control electrode of the fifteenth transistor is connected to the fourth clock signal terminal.

7. The integrated circuit unit of claim 6, wherein the fourteenth transistor, the fifteenth transistor and the twenty-third transistor each have a plurality of control electrodes, and second control electrodes of the fourteenth transistor, the fifteenth transistor and the twenty-third transistor are all connected to the third node.

8. The integrated circuit unit of claim 1, wherein the third control sub-circuit comprises a third node control module, and the third node control module comprises:

a twenty-first transistor, wherein a first electrode of the twenty-first transistor is connected to the third node, and a second electrode of the twenty-first transistor is connected to the sixth power signal terminal;

a second energy storage unit connected between the third node and the fourth node; and a nineteenth transistor and a twentieth transistor connected in series between the third node and the second power signal terminal, wherein a control electrode of the nineteenth transistor is connected to the first node, and a control electrode of the twentieth transistor is connected to the fourth clock signal terminal.

9. The integrated circuit unit of claim 1, wherein the third control sub-circuit comprises a third node control module, and the third node in the third node control module is directly connected to the sixth power signal terminal.

10. The integrated circuit unit of claim 1, wherein the second control sub-circuit comprises a plurality of gating transistors connected in parallel, a total number of the plurality of gating transistors is less than or equal to a total number of the plurality of gating signal terminals, and a control electrode of each of the plurality of gating transistors is connected to one gating signal terminal.

11. The integrated circuit unit of claim 10, wherein first electrodes of the plurality of gating transistors connected in parallel are connected to the third clock signal terminal, and second electrodes of the plurality of gating transistors connected in parallel are connected to a control electrode of a twelfth transistor for controlling an electrical connection between the second clock signal terminal and the first node.

12. The integrated circuit unit of claim 11, wherein among the gating signal terminals connected to the gating transistors, a pulse width of a gating signal of an $n^{th}$ gating signal terminal is twice a pulse width of a gating signal of an $(n-1)^{th}$ gating signal terminal.

13. The integrated circuit unit of claim 12, wherein in one period of each of the gating signal terminals, a high level width of the gating signal is equal to a low level width of the gating signal.

14. A gate drive circuit, comprising a plurality of groups of integrated circuit units, each of the groups of integrated circuit units comprising at least one integrated circuit unit of claim 1, a total number of gating signal terminals being twice a total number of gating transistors, the gating signal terminals comprising positive gating signal terminals and negative gating signal terminals outputting signals opposite to signals from the positive gating signal terminals.

15. The gate drive circuit of claim 14, wherein each of the groups of integrated circuit units comprises four integrated circuit units, the integrated circuit units in one group are connected to the gating signal terminals in a same way, and are connected to clock signal terminals in different orders.

16. The gate drive circuit of claim 15, wherein the integrated circuit units in different groups are connected to the gating signal terminals in different ways.

17. A display panel, comprising the gate drive circuit of claim 14.

* * * * *